(12) United States Patent
Tseng et al.

(10) Patent No.: US 9,099,929 B2
(45) Date of Patent: Aug. 4, 2015

(54) POWER CONVERTING DEVICE AND SYNCHRONOUS RECTIFIER CONTROL CIRCUIT

(71) Applicant: LITE-ON TECHNOLOGY CORP., Taipei (TW)

(72) Inventors: Po-Jung Tseng, Taipei (TW); Chin-Chuan Huang, Taipei (TW); Sin-Li Lin, Taipei (TW); Yu-Kang Lo, Taipei (TW); Huang-Jen Chiu, Taipei (TW); Jing-Yuan Lin, Taipei (TW)

(73) Assignee: Lite-On Technology Corp., Taipei (TW)

( * ) Notice: Subject to any disclaimer, the term of this patent is extended or adjusted under 35 U.S.C. 154(b) by 116 days.

(21) Appl. No.: 14/047,146

(22) Filed: Oct. 7, 2013

(65) Prior Publication Data

US 2014/0119063 A1 May 1, 2014

(30) Foreign Application Priority Data

Oct. 31, 2012 (TW) .............................. 101140350 A (51) Int. Cl.
*H02M 3/137* (2006.01)
*H02M 3/335* (2006.01)
*H02M 1/36* (2007.01)
*H02M 1/00* (2007.01)

(52) U.S. Cl.
CPC ............ *H02M 3/33592* (2013.01); *H02M 1/36* (2013.01); *H02M 2001/0019* (2013.01); *Y02B 70/1475* (2013.01)

(58) Field of Classification Search
CPC .............. H02M 3/33592; H02M 1/36; H02M 2001/0019; H02M 3/156; H02M 3/1588; Y02B 70/1475
See application file for complete search history.

(56) References Cited

U.S. PATENT DOCUMENTS

| | | | |
|---|---|---|---|
| 2009/0129125 A1* | 5/2009 | Yang | 363/21.14 |
| 2012/0294052 A1* | 11/2012 | Reddy et al. | 363/49 |
| 2013/0300392 A1* | 11/2013 | Laur et al. | 323/284 |
| 2013/0307511 A1* | 11/2013 | De Vries | 323/284 |

* cited by examiner

*Primary Examiner* — Harry Behm
*Assistant Examiner* — Peter Novak
(74) *Attorney, Agent, or Firm* — Rosenberg, Klein & Lee (57) ABSTRACT

A power converting device includes a main switch, a synchronous rectifier switch, a rectifier-filter circuit which outputs an output voltage, and a synchronous rectifier control circuit which includes a sampling circuit coupled to the rectifier-filter circuit for outputting a voltage variation signal, a differential amplifier circuit that outputs an amplified signal by adding the output voltage and an offset voltage to the voltage variation signal attenuated thereby, and a comparison circuit that compares the amplified signal with the output voltage so as to output a trigger signal, such that the synchronous rectifier switch is turned on when the main switch is turned off, and is turned off prior to conduction of the main switch.

12 Claims, 8 Drawing Sheets

POWER CONVERTING DEVICE AND SYNCHRONOUS RECTIFIER CONTROL CIRCUIT

CROSS-REFERENCE TO RELATED APPLICATION

This application claims priority of Taiwanese Patent Application No. 101140350, filed on Oct. 31, 2012.

BACKGROUND OF THE INVENTION

1. Field of the Invention

The invention relates to a power converting device, more particularly to a power converting device which adopts a synchronous rectifier circuit.

2. Description of the Related Art

Figure 1:
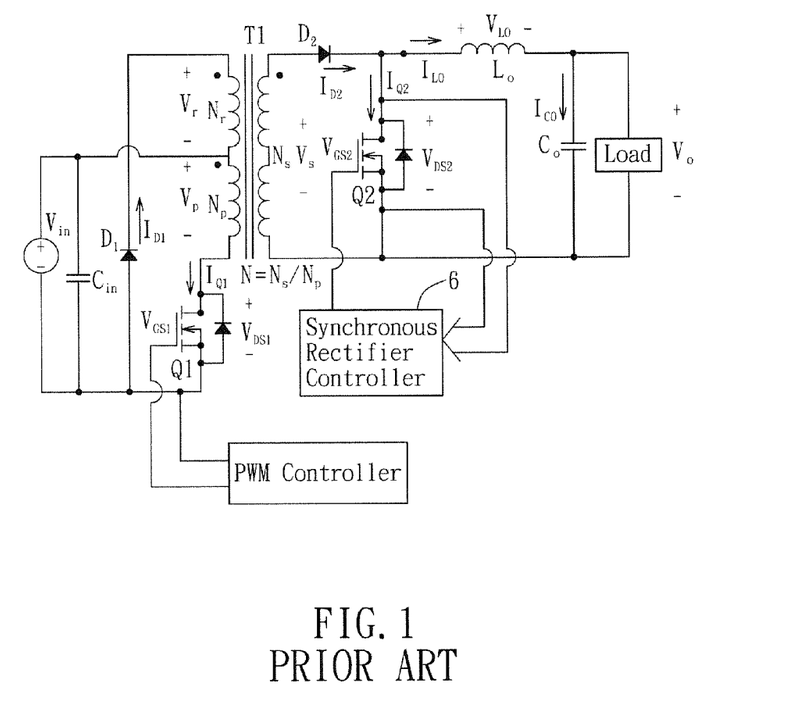
FIG. 1 illustrates a circuit diagram of an existing isolation forward power converter.

In a conventional forward power converter, a main switch is disposed at the primary side thereof, and a rectifier circuit which is composed of rectifier diodes is disposed at a secondary side thereof. However, a considerable energy loss is incurred from conduction of the rectifier diodes. Therefore, referring to FIG. 1, a synchronous rectifier switch (MOS transistor switch) Q2 is usually adopted to replace the rectifier diodes at the secondary side of a transformer T1 of an existing forward power converter, and a synchronous rectifier controller 6 is used to control conduction and non-conduction of the synchronous rectifier switch Q2.

The existing synchronous rectifier controller 6 is able to operate in one of a discontinuous conduction mode (DCM) and a continuous conduction mode (CCM) in response to a requirement for different loads of the forward power converter. For example, a conventional synchronous rectifier controller of a model number SG6203 is able to detect the voltage drop at the synchronous rectifier switch Q2, and to detect a magnitude of a current associated with the synchronous rectifier switch Q2, so as to control the synchronous rectifier switch Q2 to become non-conductive upon detecting that the magnitude of the current drops to zero. However, the aforementioned control method is only suitable for the DCM. In the CCM, since the synchronous rectifier switch Q2 is required to be switched to non-conduction before an output current (i.e., a current flowing through the synchronous rectifier switch Q2) drops to zero, the synchronous rectifier controller of the model number SG6203 is incapable of operating in the CCM by means of detecting the magnitude of the current through the synchronous rectifier switch Q2. Therefore, the SG6203 still requires an RC (resistor-capacitor) trigger to forcibly turn off the synchronous rectifier circuit Q2. However, owing to the RC time constant of the RC trigger, the aforementioned solution is not suitable for a situation where a load varies rapidly.

Furthermore, a conventional synchronous rectifier controller of a model number STSR30 utilizes an up counter and a down counter of a digital circuit to calculate most recent duty cycles of the main switch Q1 and the synchronous rectifier switch Q2. The most recent duty cycles thus calculated are adapted to serve as next duty cycles of the main switch Q1 and the synchronous rectifier switch Q2, such that the STSR30 is able to operate in the DCM and the CCM.

On the other hand, a conventional synchronous rectifier controller of a model number FAN6204 applies the volt-second balance principle, and calculates charge time and discharge time of a timing capacitor so as to control conduction times of the main switch Q1 and the synchronous rectifier switch Q2. Specifically, when the main switch Q1 is conductive, the timing capacitor is charged until the main switch Q1 becomes non-conductive, and subsequently, the timing capacitor starts to discharge, causing the synchronous rectifier switch Q2 to become conductive until the timing capacitor discharges completely. In this way, the FAN6204 is able to operate in the DCM and the CCM.

Figure 2:
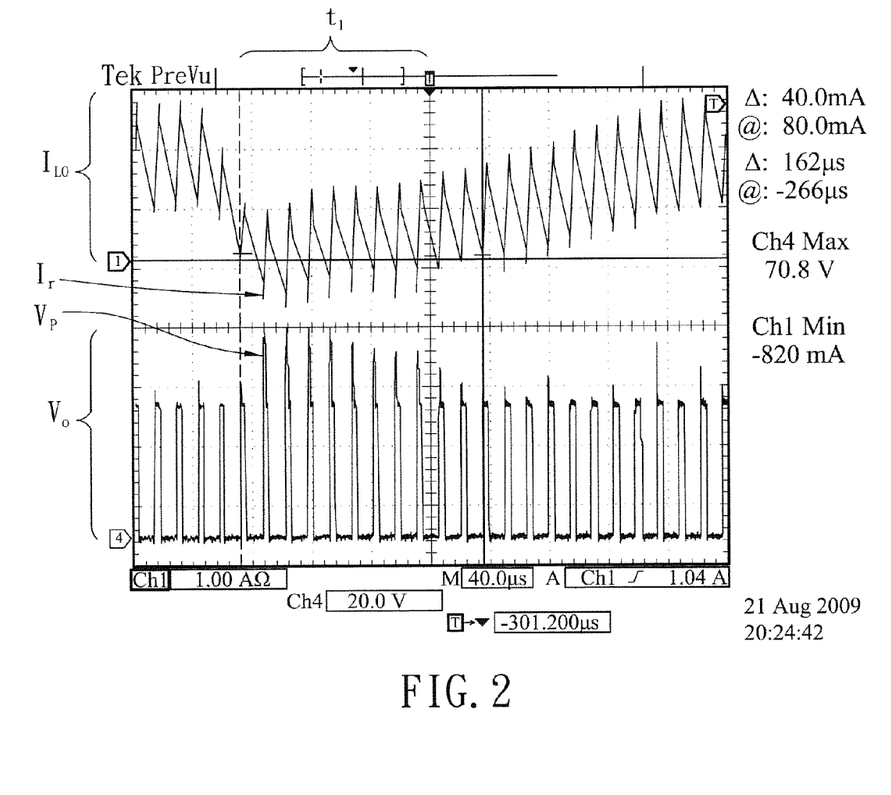
FIG. 2 illustrates that, while the existing isolation forward power converter operates in a continuous conduction mode (CCM), within a time interval $t_1$ when a load varies from a heavy load to a light load, a voltage spike $V_{sp}$ is generated across a synchronous rectifier switch at the moment when an output current $I_{LO}$ is zero and the synchronous rectifier switch is still conductive.

All of the aforesaid synchronous rectifier controllers of model numbers SG6203, STSR30, and FAN6204 utilize the charging and discharging of a capacitor for counting or for determining the conducting time and non-conducting time of switches. Nevertheless, the capacitor takes a response time to charge and discharge, such that when the load varies rapidly, for example, referring to FIG. 2, within a time interval t1 when the load varies from a heavy load to a light load, the synchronous rectifier controller may not catch up with switching changes of the main switch Q1 because it takes time for the capacitor to charge and discharge. The synchronous rectifier switch Q2 may thus not be turned off (i.e., non-conductive) in time, so that the main switch Q1 at the primary side may become conductive at the time the synchronous rectifier switch Q2 is not yet turned off. In this situation, the synchronous rectifier switch Q2 has to sustain an instantaneous high voltage generated by a secondary winding according to induction of an electromagnetic field from a primary winding. At the same time, since the synchronous rectifier switch Q2 is still conductive, when an output current $I_{LO}$ drops to zero, a reverse current Ir occurs as a result of an output capacitor Co discharging toward an output inductor Lo and the synchronous rectifier switch Q2, such that a voltage spike $V_{sp}$ is generated between a drain terminal and a source terminal of the synchronous rectifier switch Q2 at the instant when the synchronous rectifier switch Q2 is turns off. The synchronous rectifier switch Q2 may be damaged by the voltage spike $V_{sp}$ if voltage tolerance thereof is insufficient.

This reverse current Ir not only occurs when the load varies rapidly, but also occurs at the moment when the power converter is started up or shut down. When the power converter is started up or shut down, the output current $I_{LO}$, may have a moment of zero current, such that the synchronous rectifier switch Q2 may be damaged by the voltage spike $V_{sp}$, if not turned off in time. A synchronous rectifier forward converter including a reverse current suppressor is disclosed in U.S. Pat. No. 7,589,982. The synchronous rectifier switch thereof is adapted to be turned off earlier than shutdown of the synchronous rectifier forward converter so as to eliminate or suppress the reverse current. However, the synchronous rectifier forward converter disclosed in the U.S. patent is also incapable of preventing generation of the reverse current under the condition that the load varies rapidly.

SUMMARY OF THE INVENTION

Therefore, an object of the present invention is to provide a power converting device which ensures that, no matter which one of the CCM and DCM the power converting device operates, the switches at the primary side and the secondary side may be prevented from conducting at the same time. Moreover, when the load varies rapidly or when the power converting device is started up or shut down, generation of the reverse current may also be prevented, so as to promote circuit stability.

Accordingly, the power converting device of this invention comprises a main switch, a synchronous rectifier switch, a rectifier-filter circuit, and a synchronous rectifier control circuit. The rectifier-filter circuit includes an output inductor having a first end coupled electrically to a first end of the synchronous rectifier switch, and an output capacitor that is coupled electrically between a second end of the synchronous rectifier switch and a second end of the output inductor so as to output an output voltage. The synchronous rectifier control circuit includes a sampling circuit, a differential amplifier circuit, a comparison circuit, and a driving circuit. The sampling circuit is coupled electrically between the first and second ends of the output inductor for outputting a voltage variation signal. The differential amplifier circuit is configured to receive the voltage variation signal, the output voltage and an offset voltage, to attenuate the voltage variation signal, and to output an amplified signal by adding the output voltage and the offset voltage to the voltage variation signal thus attenuated. The comparison circuit is configured to receive the amplified signal and the output voltage, and to compare the amplified signal with the output voltage so as to output a trigger signal. The driving circuit is configured to control conduction and non-conduction of the synchronous rectifier switch, and to receive a first driving signal and the trigger signal so as to generate a second driving signal according to the first driving signal and the trigger signal. The first driving signal is used to control conduction and non-conduction of the main switch. The second driving signal is used to control the synchronous rectifier switch to become conductive when the main switch is controlled to become non-conductive, and to control the synchronous rectifier switch to become non-conductive prior to conduction of the main switch.

Another object of the present invention is to provide a synchronous rectifier control circuit for a power converting device.

Accordingly, the synchronous rectifier control circuit of this invention is to be applied to a power converting device which includes a main switch, a synchronous rectifier switch, an output inductor having a first end coupled electrically to a first end of the synchronous rectifier switch, and an output capacitor that is coupled electrically between a second end of the synchronous rectifier switch and a second end of the output inductor so as to output an output voltage. The synchronous rectifier control circuit comprises a sampling circuit, a differential amplifier circuit, a comparison circuit, and a driving circuit. The sampling circuit is to be coupled electrically between the first and second ends of the output inductor for outputting a voltage variation signal. The differential amplifier circuit is configured to receive the voltage variation signal, the output voltage and an offset voltage, to attenuate the voltage variation signal, and to output an amplified signal by adding the output voltage and the offset voltage to the voltage variation signal thus attenuated. The comparison circuit is configured to receive the amplified signal and the output voltage, and to compare the amplified signal with the output voltage so as to output a trigger signal. The driving circuit is configured to control conduction and non-conduction of the synchronous rectifier switch, and to receive a first driving signal and the trigger signal so as to generate a second driving signal according to the first driving signal and the trigger signal. The first driving signal is used to control conduction and non-conduction of the main switch. The second driving signal is used to control the synchronous rectifier switch to become conductive when the main switch is controlled to become non-conductive, and to control the synchronous rectifier switch to become non-conductive prior to conduction of the main switch.

BRIEF DESCRIPTION OF THE DRAWINGS

Other features and advantages of the present invention will become apparent in the following detailed description of two preferred embodiments with reference to the accompanying drawings, of which.

DETAILED DESCRIPTION OF THE PREFERRED EMBODIMENTS

Figure 3:
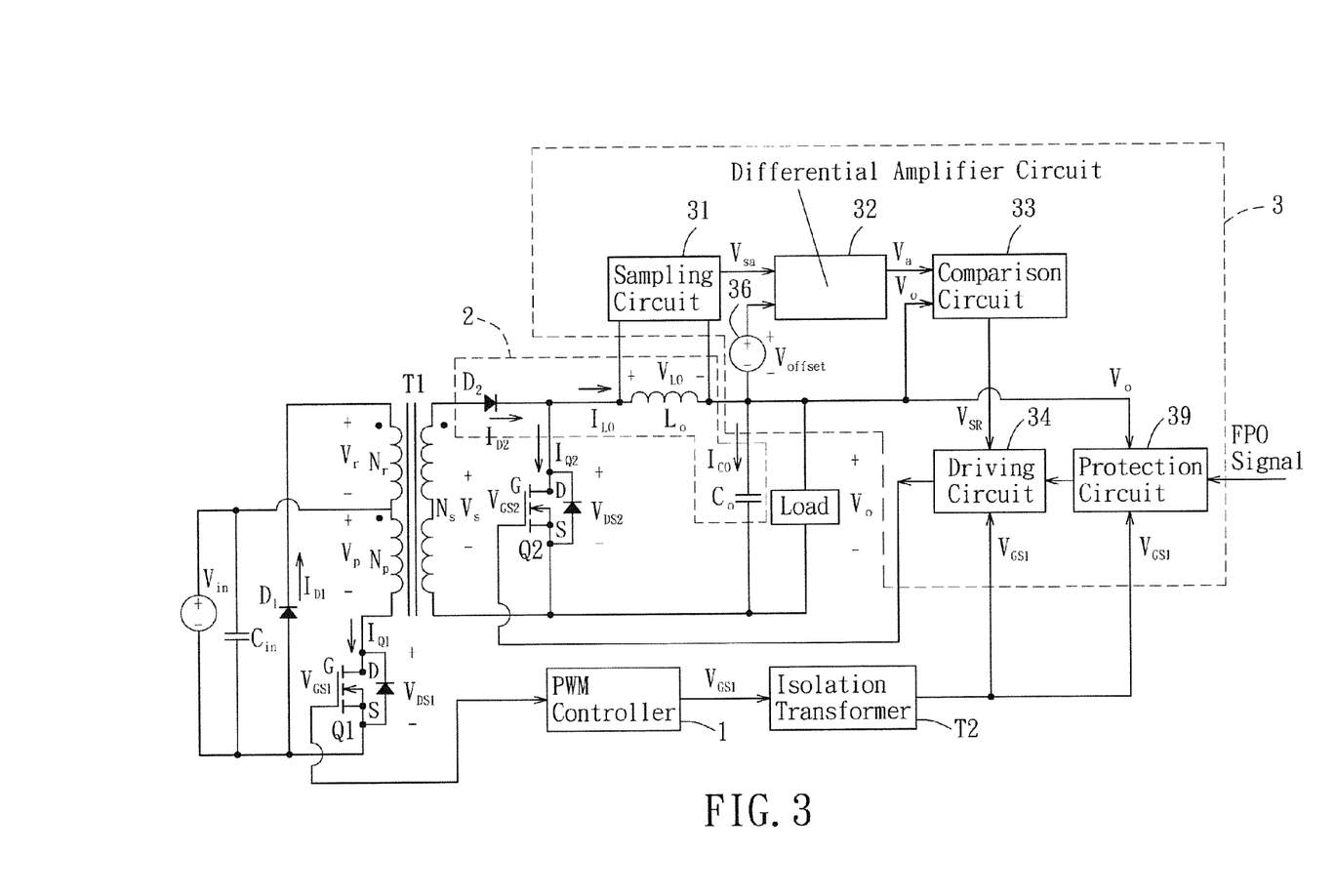
FIG. 3 is a circuit diagram of an isolation forward power converter illustrating a first preferred embodiment of a power converting device of the present invention.

Referring to FIG. 3, an isolation forward power converter is given as an example for a first preferred embodiment of a power converting device according to the present invention. The first preferred embodiment of the power converting device comprises a transformer $T_1$, a first switch (i.e., a main switch) Q1 disposed at a primary side of the transformer $T_1$, a pulse-width modulation (PWM) controller 1 adapted to control conduction and non-conduction of the first switch Q1, a rectifier-filter circuit 2 disposed at a secondary side of the transformer $T_1$, a second switch (i.e., a synchronous rectifier switch) Q2, and a synchronous rectifier control circuit 3 adapted to control conduction and non-conduction of the second switch Q2.

The transformer T has a primary winding $N_p$ and a secondary winding $N_s$. The primary winding $N_p$ has a first end coupled electrically to a high voltage side of an input source for receiving an input voltage $V_{in}$. The secondary winding $N_S$ generates an induced voltage $V_s$ in response to induction associated with receipt of the input voltage $V_{in}$ by the primary winding $N_p$.

The first switch Q1 is a Metal-Oxide-Semiconductor Field Effect Transistor (MOSFET), and has a first end (Drain) D coupled electrically to a second end of the primary winding $N_p$, a second end (Source) S coupled electrically to a low voltage side of the input source, and a control end (Gate) G.

The PWM controller 1 is coupled electrically to the control end G of the first switch Q1, and generates a first driving signal $V_{GS1}$ for controlling conduction and non-conduction of the first switch Q1.

The rectifier-filter circuit 2 is composed of a series connection of a diode $D_2$, an output inductor $L_O$ and an output capacitor $C_O$, and is configured to rectify the induced voltage $V_s$ so as to generate a direct-current (DC) output voltage $V_o$ to a load coupled to the power converting device. Specifically, the diode D, has an anode coupled electrically to a dotted-end of the secondary winding $N_s$ and the output capacitor $C_o$ is coupled electrically to a non-dotted end of the secondary winding $N_s$.

The second switch Q2 is a MOSFET, and has a control end (Gate) G, a first end (Drain) D coupled electrically to the rectifier-filter circuit 2, and a second end (Source) S. Specifically, the first end D of the second switch Q2 is coupled electrically to a cathode of the diode $D_2$ and a first end of the output inductor $L_O$. The second end S of the second switch Q2 is coupled electrically to the non-dotted end of the secondary winding N. Accordingly, the output capacitor $C_O$ of the rectifier-filter circuit 2 is coupled electrically between the second end S of the second switch Q2 and a second end of the output inductor $L_O$ so as to output the output voltage $V_O$.

The synchronous rectifier control circuit 3 includes a sampling circuit 31, a differential amplifier circuit 32, a comparison circuit 33, and a driving circuit 34. The sampling circuit 31 is coupled electrically between the first and second ends of the output inductor $L_O$ for outputting a voltage variation signal $V_{Sa}$, and transmits the voltage variation signal $V_{Sa}$, to the differential amplifier circuit 32. The differential amplifier circuit 32 is configured to receive the voltage variation signal $V_{Sa}$, the output voltage $V_O$ and an offset voltage $V_{offset}$, to attenuate the voltage variation signal $V_{Sa}$, and to output an amplified signal $V_a$ by adding the output voltage $V_O$, and the offset voltage $V_{offset}$ to the voltage variation signal $V_{Sa}$, thus attenuated. The comparison circuit 33 is configured to receive the amplified signal $V_a$ and the output voltage $V_O$, and to compare the amplified signal $V_a$ with the output voltage $V_O$ so as to output a trigger signal $V_{SR}$ to the driving circuit 34. The driving circuit 34 is configured to control conduction and non-conduction of the second switch Q2, and to receive the first driving signal $V_{GS1}$ generated by the PWM controller 1 and the trigger signal so as to generate a second driving signal $V_{GS2}$ according to the first driving signal $V_{GS2}$, and the trigger signal $V_{SR}$. The second driving signal $V_{GS2}$ is used to control the second switch Q2 to become conductive when the first switch Q1 is controlled to become non-conductive, and to control the second switch Q2 to become non-conductive prior to conduction of the first switch Q1.

Figure 4:
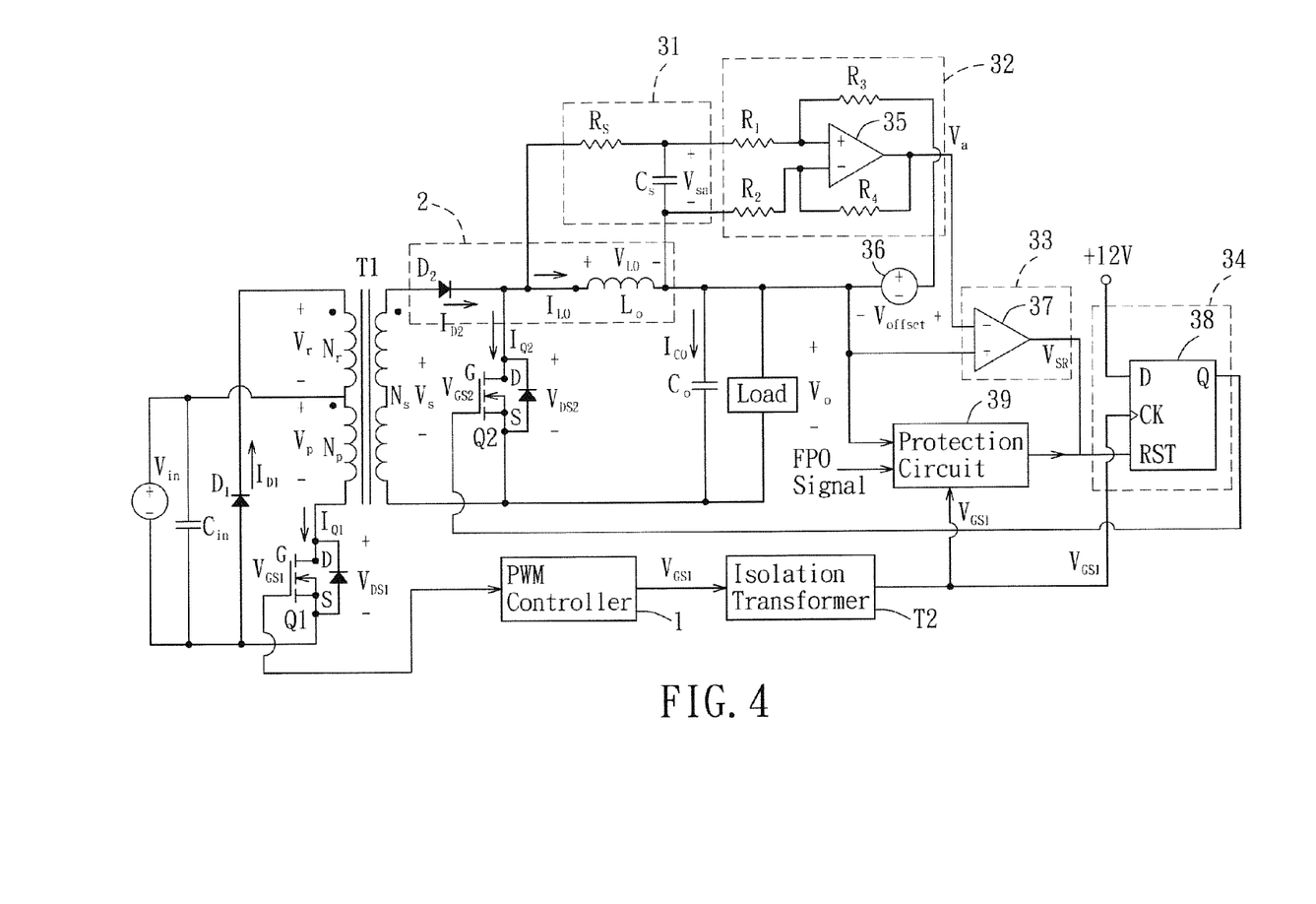
FIG. 4 illustrates detailed circuits of components in the first preferred embodiment.
Figure 5:
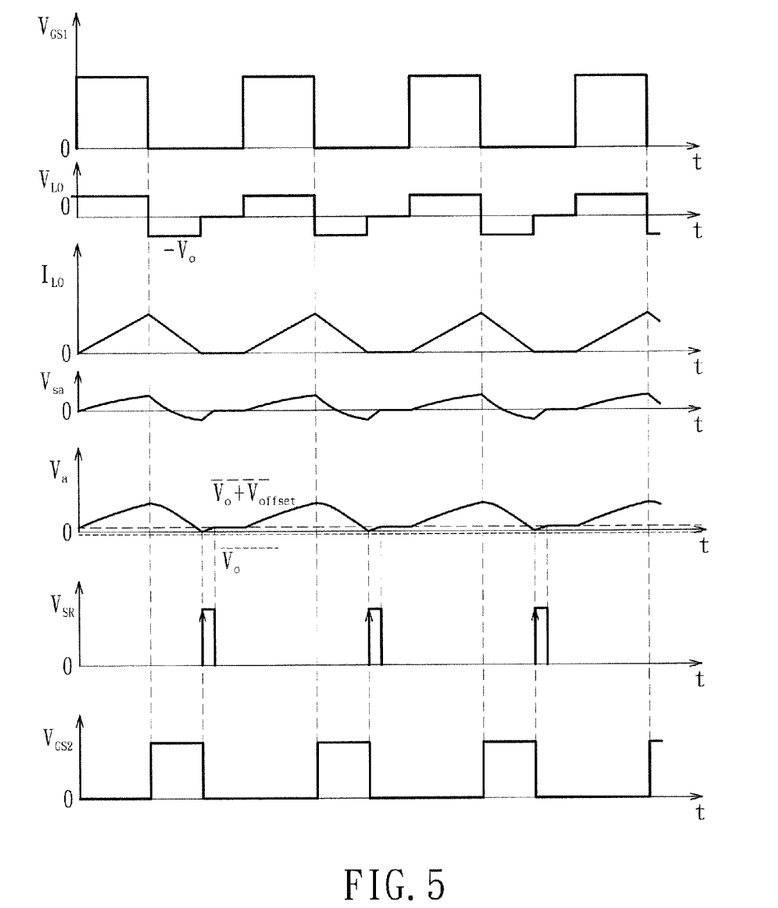
FIG. 5 illustrates waveforms of a trigger signal $V_{SR}$ and a second driving signal $V_{GS2}$ for controlling a synchronous rectifier switch when the first preferred embodiment operates in a discontinuous conduction mode (DCM)
Figure 6:
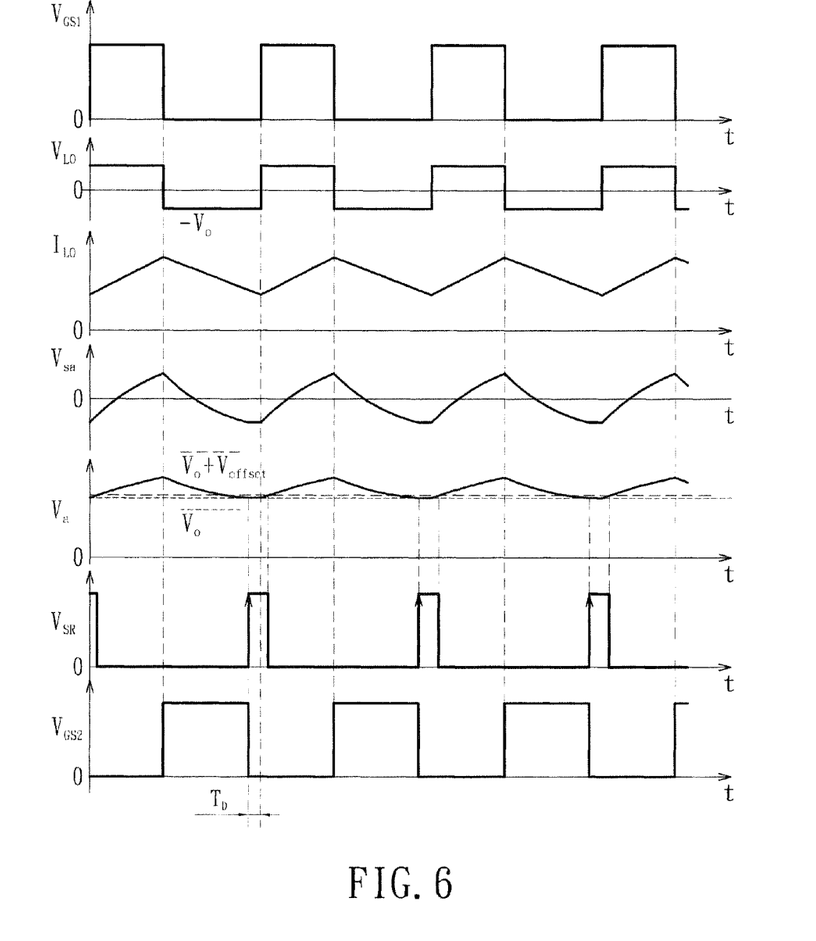
FIG. 6 illustrates waveforms of the trigger signal $V_{SR}$, and the second driving signal $V_{GS2}$ for controlling the synchronous rectifier switch when the first preferred embodiment operates in a continuous conduction mode (CCM)

Specifically, referring to FIG. 4, the sampling circuit 31 includes a sampling resistor $R_S$ and a sampling capacitor $R_C$ which are connected in series to form an RC circuit. The RC circuit is connected in parallel with the output inductor $L_O$. The sampling circuit 31 applies the volt-second balance principle to the output inductor $L_O$, and performs integration (charge, discharge) by means of the RC circuit so as to detect an output current $I_{LO}$, flowing though the output inductor $L_O$. It is noted that the voltage variation signal $V_{Sa}$ outputted from the sampling circuit 31 may be deemed as equivalent to the output current $I_{LO}$. FIG. 5 illustrates the voltage variation signal $V_{Sa}$ outputted from the sampling circuit 31 when the power converting device operates in a discontinuous conduction mode (DCM). FIG. 6 illustrates the voltage variation signal $V_{Sa}$, outputted from the sampling circuit 31 when the power converting device operates in a continuous conduction mode (CCM).

The first preferred embodiment of the power converting device further comprises an offset voltage source 36 which has a positive end, and a negative end coupled electrically to a junction of the output inductor $L_O$ and the output capacitor $C_o$, and which provides the offset voltage $V_{offset}$ to the differential amplifier circuit 32.

The differential amplifier circuit 32 includes an operational amplifier 35, a first resistor $R_1$, a second resistor $R_2$, a third resistor $R_3$, and a fourth resistor F. The operational amplifier 35 has a non-inverting input terminal (+), an inverting input terminal (−), and an output terminal. The first resistor $R_1$ is coupled electrically between the non-inverting input terminal and a first end of the sampling capacitor $C_S$ which is connected to the sampling resistor $R_S$. The second resistor $R_2$ is coupled electrically between the inverting input terminal and a second end of the sampling capacitor $C_S$. The third resistor $R_3$ is coupled electrically between the non-inverting input terminal and the positive terminal of the offset voltage source 36. The fourth resistor $R_4$ is coupled electrically between the inverting input terminal and the output terminal of the operational amplifier 35. The first to fourth resistors $R_1$-$R_4$ and the operational amplifier 35 cooperate to form a differential amplifier which performs attenuation on the voltage variation signal $V_{Sa}$, so as to output an attenuated voltage variation signal, and which adds the output voltage $V_O$ and the offset voltage $V_{offset}$ to the attenuated voltage variation signal so as to output the amplified signal $V_a$ at the output terminal of the operational amplifier 35. FIG. 5 illustrates the amplified signal $V_a$ outputted from the differential amplifier circuit 32 when the power converting device operates in the DCM. FIG. 6 illustrates the amplified signal $V_a$ outputted from the differential amplifier circuit 32 when the power converting device operates in the CCM.

The comparison circuit 33 includes a comparator 37 which has an inverting input terminal (−) adapted to receive the amplified signal $V_a$, a non-inverting input terminal (+) adapted to receive the output voltage $V_O$, and an output terminal. The comparator 37 is configured to compare the amplified signal $V_a$ with the output voltage V, and to output the trigger signal $V_{SR}$ at the output terminal thereof. Referring to FIG. 5, when the power converting device operates in the DCM, a rising edge of the trigger signal $V_{SR}$ takes place at a time point when the amplified signal $V_a$ reaches zero, and a pulse width of the trigger signal $V_{SR}$ depends upon a value of the offset voltage $V_{offset}$. Referring to FIG. 6, when the power converting device operates in the CCM, the rising edge and the pulse width of the trigger signal $V_{SR}$ depend upon the value of the offset voltage $V_{offset}$. That is to say, by adjusting the value of the offset voltage $V_{offset}$, a duty cycle of the second switch Q2 and a time interval (also referred to as a dead time $T_D$) by which the second switch Q2 is controlled to become non-conductive before conduction of the first switch Q1 may be adjusted. The dead time $T_D$ may be defined as a time interval after non-conduction of the second switch Q2 and prior to conduction of the first switch Q1. The dead time $T_D$ is of several nanosecond ($10^{-9}$ second) scales, and a response time for controlling the first and second switches Q1 and Q2 is thus far shorter than the time it takes for rapid variances of the load. Therefore, the power converting device of the present invention is able to operate normally in a situation where the load varies rapidly.

Referring to FIG. 4, the driving circuit 34 includes a D flip-flop 38 which has a reset terminal (RST) disposed to receive the trigger signal $V_{SR}$, a D-input terminal (D) disposed to receive a high logic level input signal, such as a 12V voltage input, a trigger terminal (CK) disposed to receive the first driving signal $V_{GS1}$, and a Q-output terminal (Q) disposed to output the second driving signal $V_{GS2}$. The D flip-flop 38 is triggered by a falling edge of the first driving signal $V_{GS1}$. The first driving signal $V_{GS1}$ is outputted from the PWM controller 1 to an isolation transformer T2, and is outputted from the isolation transformer T2 to the trigger terminal (CK) of the D flip-flop 38.

Consequently, under a condition that the power converting device operates in the DCM, referring to FIG. 5 in combination with FIG. 4, when the first driving signal $V_{GS1}$, falls from a high logic level to a low logic level (falling edge-triggered), the second driving signal $V_{GS2}$ is controlled by the D flip-flop 38 to rise from a low logic level to a high logic level, so as to drive the second switch Q2 to become conductive (i.e., turn on the second switch Q2). The second switch Q2 remains conductive until a rising edge of the trigger signal $V_{SR}$ triggers the reset terminal (RST) of the D flip-flop 38 such that the D flip-flop 38 controls the second driving signal $V_{GS2}$ to fall from the high logic level to the low logic level, so as to drive the second switch Q2 to become non-conductive. Accordingly, the second driving signal $V_{GS2}$ is generated for driving the second switch Q2 to become conductive when the first switch Q1 is controlled to become non-conductive, and for driving the second switch Q2 to become non-conductive when the amplified signal $V_a$ reaches zero (at which time, the output current $L_{LO}$ is also zero), such that the power converting device is able to operate normally in the DCM. Since the second switch Q2 is turned off (i.e., become non-conductive) when the output current $I_{LO}$ is zero, under the condition that the power converting device operates in the DCM, the first switch Q1 and the second switch Q2 do not conduct simultaneously even if the load varies rapidly. Moreover, since the second switch Q2 is turned off when the output current $I_{LO}$ is zero, a reverse current which results from discharging of the output capacitor C, toward the output inductor $L_o$ and the second switch Q2 may not be generated.

Similarly, under a condition that the power converting device operates in the CCM, referring to FIG. 6 in combination with FIG. 4, when the first driving signal $V_{GS1}$ falls from the high logic level to the low logic level (falling edge-triggered), the second driving signal $V_{GS2}$ is controlled by the D flip-flop 38 to rise from the low logic level to the high logic level, so as to drive the second switch Q2 to become conductive. The second switch Q2 remains conductive until a rising edge of the trigger signal $V_{SR}$ triggers the reset terminal (RST) of the D flip-flop 38 such that the D flip-flop 38 controls the second driving signal $V_{GS2}$ to fall from the high logic level to the low logic level, so as to drive the second switch Q2 to become non-conductive. Accordingly, the second driving signal $V_{GS2}$ is generated for driving the second switch Q2 to become conductive when the first switch Q1 is controlled to become non-conductive, and for driving the second switch Q2 to become non-conductive when the amplified signal $V_a$ drops to be lower than the output voltage $V_O$ (at which time, the output current $I_{LO}$, is higher than zero), such that the second switch Q2 may be turned off prior to conduction of the first switch Q1. The power converting device is thus able to operate normally in the CCM. Furthermore, since the first switch Q is controlled to become conductive before the output current $I_{LO}$ drops to zero, the second switch Q2 is required to be turned off prior to conduction of the first switch Q1, so as to prevent the first switch Q1 and the second switch Q2 from conducting at the same time. Therefore, prior to the first driving signal $V_{GS1}$ rising from the low logic level to the high logic level, the trigger signal $V_{SR}$ is configured to trigger the reset terminal (RST) of the D flip-flop 38 in advance to control the second driving signal $V_{GS2}$ to fall from the high logic level to the low logic level, so as to turn off the second switch Q2 prior to conduction of the first switch Q1.

Figure 7:
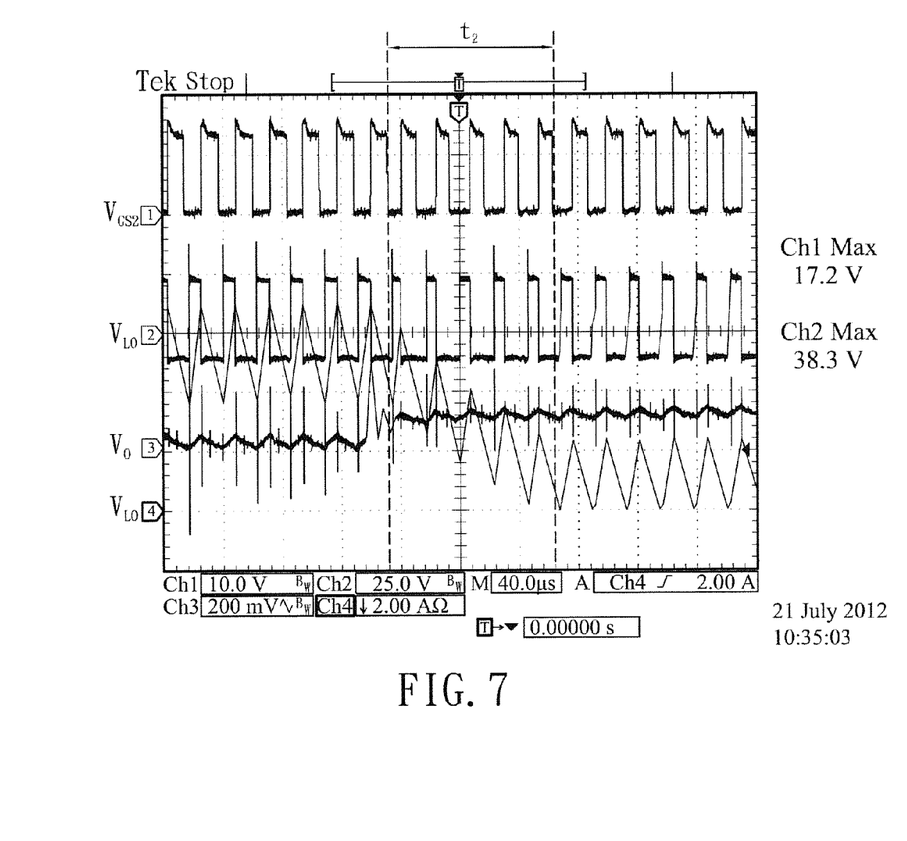
FIG. 7 illustrates that, while the first preferred embodiment operates in the CCM, within a time interval $t_2$ when a load varies from a heavy load to a light load, no voltage spike is generated across the synchronous rectifier switch.

Consequently, referring to FIG. 6, since a time point at which the second switch Q2 is turned off precedes a time point at which the first switch Q1 is turned on by the dead time $T_D$, it is assured that the first switch Q1 and the second switch Q2 do not conduct simultaneously. Accordingly, referring to FIG. 7, within a time interval t2 when the load varies from a heavy load to a light load, since the trigger signal $V_{SR}$ is able to trigger the driving circuit 34 to turn off the second switch Q2 prior to conduction of the first switch Q1, and since the trigger signal $V_{SR}$ is able to trigger the driving circuit 34 to turn off the second switch Q2 before the output current $I_{LO}$ drops to zero or close to zero by means of properly selecting the offset voltage $V_{offset}$ for determining the dead time $T_D$, the reverse current which results from discharging of the output capacitor C, toward the second switch Q2 via the output inductor L, may be prevented under a condition of a light load. Therefore, the second switch Q2 may be prevented from being damaged by a voltage spike generated between the first end D and the second end S of the second switch Q2 as a result of the reverse current when the load varies rapidly.

Moreover, at the moment when the power converting device is shut down without power input, or when the power converting device is just started up, the output current $I_{LO}$ may also drop to zero and have a moment of zero current. The voltage variation signal $V_{Sa}$, may reflect the variation of the output current $I_{LO}$ and the voltage variation signal $V_a$ may represent the voltage variation signal $V_{Sa}$, such that the comparison circuit 33 is configured to instantly generate the trigger signal $V_{SR}$ for triggering the driving circuit 34 to control the second driving signal $V_{GS2}$ outputted therefrom to fall from the high logic level to the low logic level, so as to turn off the second switch Q2. In this way, generation of the reverse current resulting from discharging of the output capacitor $C_O$ toward the output inductor $I_{LO}$ and the second switch Q2 may be prevented.

In addition, referring once again to FIG. 3, the first preferred embodiment of the power converting device further comprises a protection circuit 39 which is configured to output a protection signal to the driving circuit 34 upon detection of conduction of the first switch Q1, upon detecting that the output voltage $V_O$ does not reach a predetermined value, such as 90% of a rated value, or upon detecting that the power converting device operates abnormally, such that the driving circuit 34 is triggered by the protection signal to instantly control the second switch Q2 to become non-conductive. More specifically, referring to FIG. 4, the protection circuit 39 is configured to receive the output voltage $V_O$, the first driving signal $V_{GS1}$ outputted from the PWM controller 1, and/or a fault protection output (FPO) signal sent from a housekeeping integrated circuit (IC) in the power converting device. The protection circuit 39 is further configured to output, upon detecting that overvoltage or undervoltage of the output voltage $V_O$ takes place, upon detection of conduction of the first switch Q1 based on the first driving signal $V_{GS1}$ or upon receipt of the FPO signal, the protection signal to trigger the reset terminal (RST) of the D flip-flop 38 of the driving circuit 34, such that the D flip-flop 38 controls the second driving signal $V_{GS2}$ outputted at the Q-output terminal to be at the low logic level so as to turn off the second switch Q2. In this way, when the power converting device operates abnormally, the second switch Q2 may not be turned on.

Figure 8:
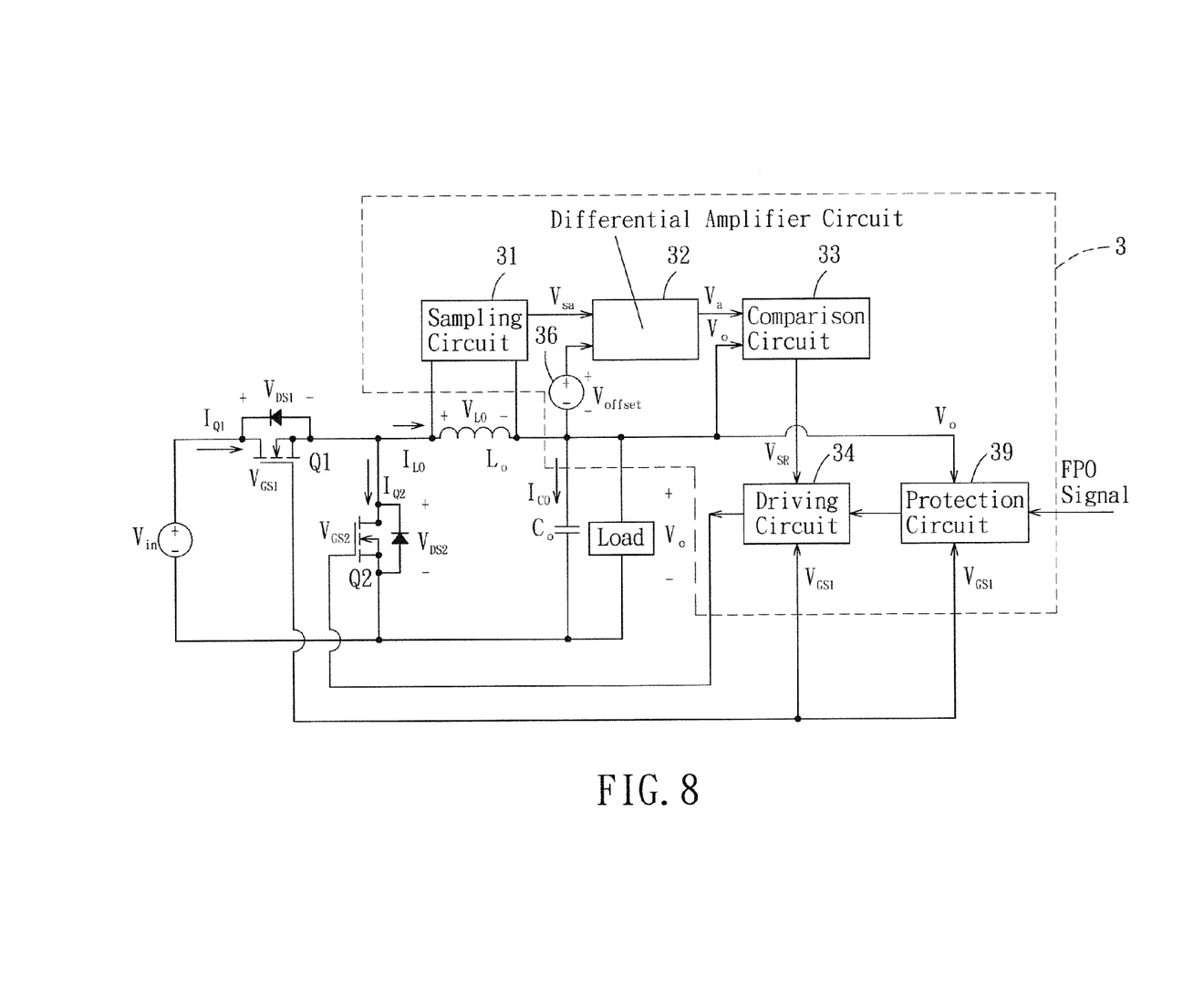
FIG. 8 is a circuit diagram of a non-isolation buck-boost power converter illustrating a second preferred embodiment of the power converting device of the present invention.

Referring to FIG. 8, a non-isolation buck-boost converter is given as an example for a second preferred embodiment of the power converting device according to the present invention. The second preferred embodiment is similar to the first preferred embodiment, and the major difference resides in that the first switch Q1 is coupled directly and electrically to the second switch Q2 without isolation of a transformer. The synchronous rectifier control circuit 3 of the second preferred embodiment for controlling the second switch Q2 is identical to that of the first preferred embodiment. The second preferred embodiment may also operate normally in the DCM and CCM, and may as well prevent the first switch Q1 and the second switch Q2 from conducting at the same time, so as to prevent generation of the reverse current.

To sum up, in the aforementioned preferred embodiments, by virtue of the sampling circuit 31 that outputs the voltage variation signal $V_{Sa}$ which may be deemed as equivalent to the output current $I_{LO}$, by virtue of the differential amplifier circuit 32 that attenuates the voltage variation signal $V_{Sa}$ and that adds the output voltage $V_O$ and the offset voltage $V_{offset}$ to the voltage variation signal thus attenuated so as to output the amplified signal $V_a$, and by virtue of the comparison circuit 33 that compares the amplified voltage $V_a$ with the output voltage $V_O$ so as to output the trigger signal $V_{SR}$, the second switch Q2 may be thus controlled by the driving circuit 34 which is triggered by the trigger signal $V_{SR}$, such that the second switch Q2 is turned off prior to conduction of the first switch Q1 and generation of the reverse current. Accordingly, the power converting device is able to operate normally and stably in either one of the DCM and CCM when the load varies rapidly. Moreover, generation of the reverse current may be as well prevented while the power converting device is started or shut down.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power converting device comprising:
   a main switch;
   a synchronous rectifier switch;
   a rectifier-filter circuit which includes
      an output inductor that has a first end coupled electrically to a first end of said synchronous rectifier switch, and
      an output capacitor that is coupled electrically between a second end of said synchronous rectifier switch and a second end of said output inductor so as to output an output voltage; and
   a synchronous rectifier control circuit which includes
      a sampling circuit which is coupled electrically between the first and second ends of said output inductor for outputting a voltage variation signal;
      a differential amplifier circuit which is configured to receive the voltage variation signal, the output voltage and an offset voltage, to attenuate the voltage variation signal, and to output an amplified signal by adding the output voltage and the offset voltage to the voltage variation signal thus attenuated;
      a comparison circuit which is configured to receive the amplified signal and the output voltage, and to compare the amplified signal with the output voltage so as to output a trigger signal; and
      a driving circuit which is configured to control conduction and non-conduction of said synchronous rectifier switch, and to receive a first driving signal and the trigger signal so as to generate a second driving signal according to the first driving signal and the trigger signal;
      wherein the first driving signal is used to control conduction and non-conduction of said main switch, the second driving signal being used to control said synchronous rectifier switch to become conductive when said main switch is controlled to become non-conductive, and to control said synchronous rectifier switch to become non-conductive prior to conduction of said main switch.

2. The power converting device as claimed in claim 1, wherein said sampling circuit includes a sampling resistor and a sampling capacitor which are connected in series to form an RC circuit, said RC circuit being connected in parallel with the output inductor.

3. The power converting device as claimed in claim 2, further comprising an offset voltage source which has a negative end coupled electrically to a junction of said output inductor and said output capacitor, and which provides the offset voltage to said differential amplifier circuit, wherein said differential amplifier circuit includes:
   an operational amplifier having a non-inverting input terminal, an inverting input terminal, and an output terminal;
   a first resistor coupled electrically between the non-inverting input terminal and a first end of said sampling capacitor which is connected to said sampling resistor;
   a second resistor coupled electrically between the inverting input terminal and a second end of said sampling capacitor;
   a third resistor coupled electrically between the non-inverting input terminal and a positive terminal of said offset voltage source; and
   a fourth resistor coupled electrically between the inverting input terminal and the output terminal of said operational amplifier;
   wherein the amplified signal is outputted at the output terminal of said operational amplifier.

4. The power converting device as claimed in claim 1, wherein said comparison circuit includes a comparator which has an inverting input terminal disposed to receive the amplified signal, a non-inverting input terminal disposed to receive the output voltage, and an output terminal, said comparator being configured to compare the amplified signal with the output voltage, and to output the trigger signal at the output terminal thereof;
   wherein said driving circuit includes a D flip-flop which has a reset terminal disposed to receive the trigger signal, a D-input terminal disposed to receive a high logic level input signal, a trigger terminal disposed to receive the first driving signal, and a Q-output terminal disposed to output the second driving signal, said D flip-flop being triggered by a falling edge of the first driving signal so as to control the second driving signal to rise from a low logic level to a high logic level, and being further triggered by a rising edge of the trigger signal so as to control the second driving signal to fall from the high logic level to the low logic level.

5. The power converting device as claimed in claim 1, further comprising a protection circuit which is configured to output a protection signal to said driving circuit upon detection of conduction of said main switch, upon detecting that the output voltage does not reach a predetermined value, or upon detecting that the power converting device operates abnormally, such that said driving circuit is triggered by the protection signal to control said synchronous rectifier switch to become non-conductive.

6. The power converting device as claimed in claim 1,
   wherein said power converting device is an isolation forward power converter and further comprises a transformer having a primary winding and a secondary winding; and
   wherein said main switch is coupled electrically to said primary winding, and said synchronous rectifier switch is coupled electrically to said secondary winding.

7. The power converting device as claimed in claim 1,
wherein said power converting device is a non-isolation buck-boost converter; and
wherein the first end of said output inductor is coupled electrically to a junction of one end of said main switch and the first end of said synchronous rectifier switch.

8. A synchronous rectifier control circuit to be applied to a power converting device which includes a main switch, a synchronous rectifier switch, an output inductor having a first end coupled electrically to a first end of the synchronous rectifier switch, and an output capacitor that is coupled electrically between a second end of the synchronous rectifier switch and a second end of the output inductor so as to output an output voltage, said synchronous rectifier control circuit comprising:
  a sampling circuit which is to be coupled electrically between the first and second ends of the output inductor for outputting a voltage variation signal;
  a differential amplifier circuit which is configured to receive the voltage variation signal, the output voltage and an offset voltage, to attenuate the voltage variation signal, and to output an amplified signal by adding the output voltage and the offset voltage to the voltage variation signal thus attenuated;
  a comparison circuit which is configured to receive the amplified signal and the output voltage, and to compare the amplified signal with the output voltage so as to output a trigger signal; and
  a driving circuit which is configured to control conduction and non-conduction of the synchronous rectifier switch, and to receive a first driving signal and the trigger signal so as to generate a second driving signal according to the first driving signal and the trigger signal;
  wherein the first driving signal is used to control conduction and non-conduction of the main switch, the second driving signal being used to control the synchronous rectifier switch to become conductive when the main switch is controlled to become non-conductive, and to control the synchronous rectifier switch to become non-conductive prior to conduction of the main switch.

9. The synchronous rectifier control circuit as claimed in claim 8, wherein said sampling circuit includes a sampling resistor and a sampling capacitor which are connected in series to form an RC circuit, said RC circuit to be connected in parallel with the output inductor.

10. The synchronous rectifier control circuit as claimed in Claim 9, the power converting device further including an offset voltage source which has a negative end coupled electrically to a junction of the output inductor and the output capacitor, and which provides the offset voltage to said differential amplifier circuit, wherein said differential amplifier circuit includes:
  an operational amplifier having a non-inverting input terminal, an inverting input terminal, and an output terminal;
  a first resistor coupled electrically between the non-inverting input terminal and a first end of said sampling capacitor which is connected to said sampling resistor;
  a second resistor coupled electrically between the inverting input terminal and a second end of said sampling capacitor;
  a third resistor to be coupled electrically between the non-inverting input terminal and a positive terminal of the offset voltage source;
  a fourth resistor coupled electrically between the inverting input terminal and the output terminal of said operational amplifier;
  wherein the amplified signal is outputted at the output terminal of said operational amplifier.

11. The synchronous rectifier control circuit as claimed in claim 8,
  wherein said comparison circuit includes a comparator which has an inverting input terminal disposed to receive the amplified signal, a non-inverting input terminal disposed to receive the output voltage, and an output terminal, said comparator being configured to compare the amplified signal with the output voltage, and to output the trigger signal at the output terminal thereof;
  wherein said driving circuit includes a D flip-flop which has a reset terminal disposed to receive the trigger signal, a D-input terminal disposed to receive a high logic level input signal, a trigger terminal disposed to receive the first driving signal, and a Q-output terminal disposed to output the second driving signal, said D flip-flop being triggered by a falling edge of the first driving signal so as to control the second driving signal to rise from a low logic level to a high logic level, and being further triggered by a rising edge of the trigger signal so as to control the second driving signal to fall from the high logic level to the low logic level.

12. The synchronous rectifier control circuit as claimed in claim 8, further comprising a protection circuit which is configured to output a protection signal to said driving circuit upon detection of conduction of the main switch, upon detecting that the output voltage does not reach a predetermined value, or upon detecting that the power converting device operates abnormally, such that said driving circuit is triggered by the protection signal to control the synchronous rectifier switch to become non-conductive.

* * * * *